(12) United States Patent
Foxlin et al.

(10) Patent No.: US 8,224,024 B2
(45) Date of Patent: Jul. 17, 2012

(54) TRACKING OBJECTS WITH MARKERS

(75) Inventors: Eric Foxlin, Arlington, MA (US);
Leonid Naimark, Brookline, MA (US)

(73) Assignee: InterSense, LLC, Billerica, MA (US)

(*) Notice: Subject to any disclaimer, the term of this patent is extended or adjusted under 35 U.S.C. 154(b) by 1546 days.

(21) Appl. No.: 11/543,008

(22) Filed: Oct. 4, 2006

(65) Prior Publication Data
US 2007/0081695 A1 Apr. 12, 2007

Related U.S. Application Data

(60) Provisional application No. 60/723,648, filed on Oct. 4, 2005.

(51) Int. Cl.
*G06K 9/00* (2006.01)
(52) U.S. Cl. ........ 382/103; 348/135; 348/137; 348/139; 348/142; 348/146; 348/169; 348/208.8
(58) Field of Classification Search .......... 382/103; 348/135, 137, 139, 142, 146, 169, 208.2
See application file for complete search history.

(56) References Cited

U.S. PATENT DOCUMENTS

| | | | |
|---|---|---|---|
| 5,615,132 A | 3/1997 | Horton et al. | |
| 6,373,047 B1 | 4/2002 | Adan et al. | |
| 6,474,159 B1 | 11/2002 | Foxlin et al. | |
| 6,603,865 B1* | 8/2003 | Yagi et al. | 382/103 |
| 6,611,141 B1* | 8/2003 | Schulz et al. | 324/226 |
| 6,681,629 B2 | 1/2004 | Foxlin et al. | |
| 6,937,255 B2* | 8/2005 | Fukuda et al. | 345/633 |
| 7,324,663 B2* | 1/2008 | Kiraly | 382/103 |
| 7,415,212 B2* | 8/2008 | Matsushita et al. | 398/140 |
| 2001/0043737 A1 | 11/2001 | Rogina et al. | |
| 2002/0049530 A1 | 4/2002 | Poropat | |
| 2004/0032970 A1 | 2/2004 | Kiraly | |
| 2004/0073360 A1* | 4/2004 | Foxlin | 701/207 |
| 2004/0201857 A1* | 10/2004 | Foxlin | 356/620 |
| 2005/0256391 A1* | 11/2005 | Satoh et al. | 600/407 |

OTHER PUBLICATIONS

Gunnam et al., "A Vision-Based DSP Embedded Navigation Sensor", IEEE Sensors Journal, 2(5):428-442 (2002).
Kim et al., "An Optical Tracker for Augmented Reality and Wearable Combuter", IEEE Virtual Reality Annual International Symposium pp. 146-150 (1997).
Search Report for International Application No. PCT/US06/38460 dated Oct. 16, 2007.

(Continued)

*Primary Examiner* — Brian Q Le
*Assistant Examiner* — Julian Brooks
(74) *Attorney, Agent, or Firm* — Fish & Richardson P.C.

(57) ABSTRACT

The spatial location and azimuth of an object are computed from the locations, in a single camera image, of exactly two points on the object and information about an orientation of the object.

One or more groups of four or more collinear markers are located in an image, and for each group, first and second outer markers are determined, the distances from each outer marker to the nearest marker in the same group are compared, and the outer marker with a closer nearest marker is identified as the first outer marker. Based on known distances between the outer markers and the marker nearest the first outer marker, an amount of perspective distortion of the group of markers in the image is estimated. Based on the perspective distortion, relative distances from each other point in the group to one of the outer markers are determined. Based on the relative distances, the group is identified.

1 Claim, 6 Drawing Sheets

OTHER PUBLICATIONS

William Frey, Michael Zyda, Robert McGhee, Bill Cockayne, Off-the-Shelf, Real-Time, Human Body Motion Capture for Synthetic Environments, 1995, Computer Science Department, Navel Postgraduate School, Monterey, CA 93943-5118.

Robert M. Haralick & Linda G. Shapiro, Computer and Robot Vision v.2, Addison-Wesley Publishing Company, pp. 66-68, 1993.

Robert van Liere & Jurriaan D. Mulder, "Optical Tracking Using Projective Invariant Marker Pattern Properties," IEEE Virtual Reality 2003 Conference, Mar. 22-26, Los Angeles, 2003.

Kiyohide Satoh, Shinji Uchiyama, and Hiroyuki Yamamoto, "A Head Tracking Method Using Bird's-Eye View Camera and Gyroscope," Proceedings of the Third IEEE and ACM International Symposium on Mixed and Augmented Reality (ISMAR 2004), pp. 202-211 Washington, D.C., Nov. 2004.

Daisuke Kotake, Kiyohide Satoh, Shinji Uchiyama, and Hiroyuki Yamamoto, "A Hybrid and Linear Registration Method Utilizing Inclination Constraint," Proceedings of the Fourth IEEE and ACM International Symposium on Mixed and Augmented Reality (ISMAR 2005), pp. 140-149 Washington, D.C., Oct. 2005.

* cited by examiner

Figure 5

TRACKING OBJECTS WITH MARKERS

CLAIM OF PRIORITY

This application claims priority under 35 USC §119(e) to U.S. Provisional Patent Application Ser. No. 60/723,648, filed on Oct. 4, 2005, the entire contents of which are hereby incorporated by reference.

TECHNICAL FIELD

This invention relates to tracking of objects.

BACKGROUND

The position of a point in 3-D space can be described by three coordinates x, y, and z. The orientation of a 3-D object is described by three additional coordinates, roll, pitch, and yaw. Roll, pitch, and yaw are measured relative to some set of axes, frequently North, East, and Down along gravity, but any fixed axes can be used. A rigid body in 3-D space thus requires six coordinates for full description of its pose (position and orientation). Tracking the complete pose of a rigid object is referred to as 6-degree-of-freedom (6-DOF) tracking.

It is well-known in the field of optical tracking systems that the position of a point-like marker (such a light-emitting diode (LED) or a reflective ball or dot) can be obtained by triangulating it with two or more cameras. The majority of optical tracking systems on the market require two or more cameras installed in the workspace with overlapping fields-of-view in order to track the position of a set of markers. To provide full 6-DOF tracking of an object, it is necessary to install at least 3 position markers on the object in a triangular shape, from which it is possible to work out the object's orientation by solving the so-called "exterior orientation problem." This triangle needs to have sufficient extent in both width and length to achieve the desired orientation accuracy, and so it can become cumbersome to mount on a slender object such as a pen, a surgical tool, or any other object with no convenient large flat surfaces.

In tracking systems, a camera is an example of a 2-D bearing-angle sensor. When it measures the centroid of a target or marker, it returns two values, usually called u and v, which relate to the horizontal and vertical displacement, respectively, of the target in the image. These measurements are related to the azimuth and elevation angles, also known as bearing angles, from the sensor to the target. The relationship is non-linear: for a simple pinhole camera model, u and v are proportional to sin (azimuth) and sin (elevation), while for cameras with lenses the distortion makes the relationship more complex. However, in either case the camera outputs are isomorphic to bearing-angles and the camera belongs to the class of 2D bearing-angle sensors.

There are many other bearing-angle sensors that have been or could be used in optical motion tracking. Some examples include a quadcell, a lateral-effect photodiode, a position-sensitive device (PSD), a projection sensor (e.g., Hamamatsu S9132), or a laser-scanner which sweeps a fan of light through a space and measures the bearing angle to a photosensor target based on the timing of the detected pulse during the sweep. Also, two single-axis bearing sensors, for example, implemented with 1-D CCD or CMOS array sensors or single-axis laser scanners, may be combined in one housing to form a 2D bearing-angle sensor. Methods other than optical imaging can also be used to form a 2D bearing sensor device. Radio frequency (RF) and acoustic techniques, including swept radar or sonar beams, time-difference-of-arrival (TDOA), and phased arrays of antennas or microphones have all been used to measure bearing angles. For the remainder of this description we will use the term "camera" to mean any device capable of measuring two bearing angles.

A tracking system which uses cameras is referred as an "optical tracking system," while a system using both optical and inertial sensors is referred as a "hybrid optical inertial tracking system" or just "hybrid tracking system." Most optical and hybrid tracking systems require some environmental installation, i.e., some sort of markers attached to the tracked objects or, if cameras are attached to the tracked objects, then markers are installed in the environment.

A variety of items can be used as markers. Examples include printed fiducial patterns, retroreflective 2-D and 3-D targets, active LEDs in the visible, IR or UV spectrum, colored marks, and natural features on an object such as corners, lines or textures which are recognizable by computer vision or pattern matching techniques. Depending on the type of the markers, they may have different physical characteristics such as size, shape, color, etc. We will use the terms marker, target, fiducial, point or LED interchangeably to mean any type of local feature on an object which can be detected by a camera, and for which the camera can measure the bearings to a specific point in the feature which we shall call the centroid (even though, for some features such as corners or textures, the measured point is not actually a centroid).

Previous optical trackers which are capable of measuring the 6-DOF motion of an object require at a minimum either:
a) two cameras viewing three target points on a rigid triangle (stereo triangulate each point in 3D then solve for pose), or
b) one camera viewing four or more target points on a rigid structure (solve perspective n-point pose recovery algorithm from analytic photogrammetry). It is also possible to solve a 3-point pose recovery algorithm, but it produces four ambiguous solutions.

SUMMARY

In general, in one aspect, the spatial location and azimuth of an object are computed from the locations, in a single camera image, of exactly two points on the object and information about an orientation of the object.

Implementations may include one or more of the following. The information about an orientation of the object comes from a first inertial sensor mounted on the object. Image locations in said camera image of one or more additional points on the object is used to identify said two points. The camera image is obtained from a camera whose optical axis is collinear with the axis of gravity. The camera image is obtained from a camera whose optical axis has a known tilt with respect to gravity. Information from a second inertial sensor measuring orientation of said camera is used to compute said spatial location and azimuth of said object. The information from said second inertial sensor includes information about pitch and roll with respect to gravity. Azimuth of the camera, if measured, is not used to compute the relative location and azimuth of the object with respect to the camera. The information from said first inertial sensor includes pitch with respect to gravity. The information from said first inertial sensor also includes roll with respect to gravity. The one or more additional points includes a third point that is closer to one of said two points than to the other, and identifying said two points includes using the location in said image of said third point to distinguish said two points from each other. The one or more additional points includes a fourth point that is collinear with the two points, and identifying the two points also includes using the location in said image of said fourth point to distinguish the linear array of points to which it belongs from other linear arrays of points. Information from said first inertial sensor includes pitch, and the pitch of the line containing the two points is equivalent to the pitch of the object. Pitch of the line containing the two points is calculated using the measured pitch and roll of the object and a known orientation of said line on the object also including updating the computed spatial location and orientation of the object based on the information about the angular velocity and linear acceleration of the object from the first inertial sensor. Drift in the updated spatial location or orientation of the object is corrected for using an updated image from the camera. The camera image is provided by a camera mounted on the head of a person. The object is a marking apparatus on the person's hand. The object is a tool. The object is a weapon. Projecting a visual display representing a virtual world, and including in the visual display a representation of the object, including locating and positioning the representation of the object based on the computed spatial location and azimuth of the object. In a display visible to the person, projecting images that supplement the person's view of their surroundings, in which the images include a representation of the object positioned in the display based on the computed spatial location and azimuth of the object.

In general, in one aspect, a set of groups of markers, each group including four or more collinear markers, is arranged such that the ratio of the distances between three fixed base markers is the same for each group in the set. In some implementations, each group has a different arrangement of one or more encoding markers than each other group. Inverting the spatial location and azimuth of the object, and from the inverted location and azimuth, determining the spatial location and orientation of a camera that produced the image. From an updated image from the camera and inertial sensors associated with the camera, determining an updated spatial location and orientation of the camera.

In general, in one aspect, a group of markers are arranged in a pattern that is uniquely identifiable by a single camera, including a linear pattern of four or more markers in which three base markers at the ends have a fixed geometry and one or more additional markers between the ends uniquely distinguish the group from other groups having the same base marker geometry.

Implementations may include one or more of the following. The markers are LEDs. A circuit board has a plurality of locations where LEDs can be installed. At least some of the locations include connections for at least two separate circuits for energizing LEDs installed at the locations. The markers include a printed pattern. The printed pattern includes white dots on a black background. The printed pattern includes black dots on a white background. The printed pattern is attached to an adhesive strip. The printed pattern is attached to a magnetic strip In general, in one aspect, one or more groups of four or more collinear markers are located in an image, and for each group, first and second outer markers are determined, the distances from each outer marker to the nearest marker in the same group are compared, and the outer marker with a closer nearest marker is identified as the first outer marker. Based on known distances between the outer markers and the marker nearest the first outer marker, an amount of perspective distortion of the group of markers in the image is estimated. Based on the perspective distortion, relative distances from each other point in the group to one of the outer markers are determined. Based on the relative distances, the group is identified.

Implementations may include one or more of the following. Identifying the group includes identifying a code value based on the distances from each other point in the group to one of the outer markers, and identifying one of a known set of groups that most closely corresponds to the code value. Based on the identified group, identifying a location of a source of the image. Based on a location of the identified group in an updated image, updating the location of the source of the image. Based on an identification of a second group in an updated image, updating the location of the source of the image.

In general, in one aspect, coordinate information is received for images, on an imaging device of a camera, of two points on an object. Pitch information is received from a sensor on the object. The coordinate information and the pitch information are used to obtain candidate values for the azimuth of the object. One azimuth value is selected based on an evaluation of the candidate azimuth values in equations relating the coordinate information and pitch information to distances of the points from the camera. In some implementations, the candidate azimuth values are calculated by solving a system of equations relating the coordinate information, pitch information, and known geometry of the object to the distances of the points from the camera.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Pose Acquisition from one Camera using just two Points and Inertial Inclination

An accurate closed-form analytical computation for the pose of an object in all six degrees of freedom can be obtained using only a single camera and only two markers if the marked object is equipped with inertial sensors to measure at least its pitch and roll relative to the camera. In some examples, as described later, pitch can be estimated without inertial sensors, but the additional information from inertial sensors provides a considerable increase in the accuracy of the computed x, y, z, and yaw coordinates. The pose is computed relative to the camera, but if the camera's position relative to the world is known, the pose is easily translated into the world-frame. By world-frame, we mean any reference frame external to the camera and object.

In some examples, the inertial sensors comprise three axes of angular rate sensing and three axes of accelerometers, but only pitch and roll relative to gravity (or to the camera) are required. The camera remains stationary at a predetermined orientation in the workspace, and the tracked object moves and is tracked in 6-DOF. Although the tracked object may be equipped with any number of markers, only two need to be visible to the camera at a given time in order to acquire an initial pose estimate or maintain tracking.

Figures 1A, 1B:
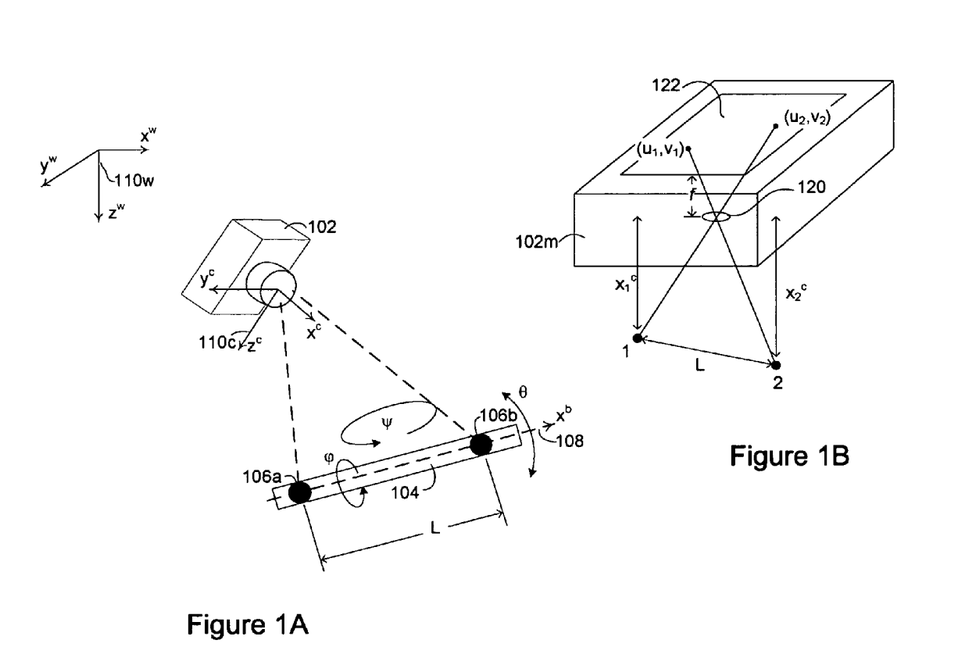
FIG. 1A shows a schematic view of and coordinate definitions for a single camera tracking an object with two target points.
FIG. 1B shows a schematic representation of the camera and object of figure 1A.
Figure 2:
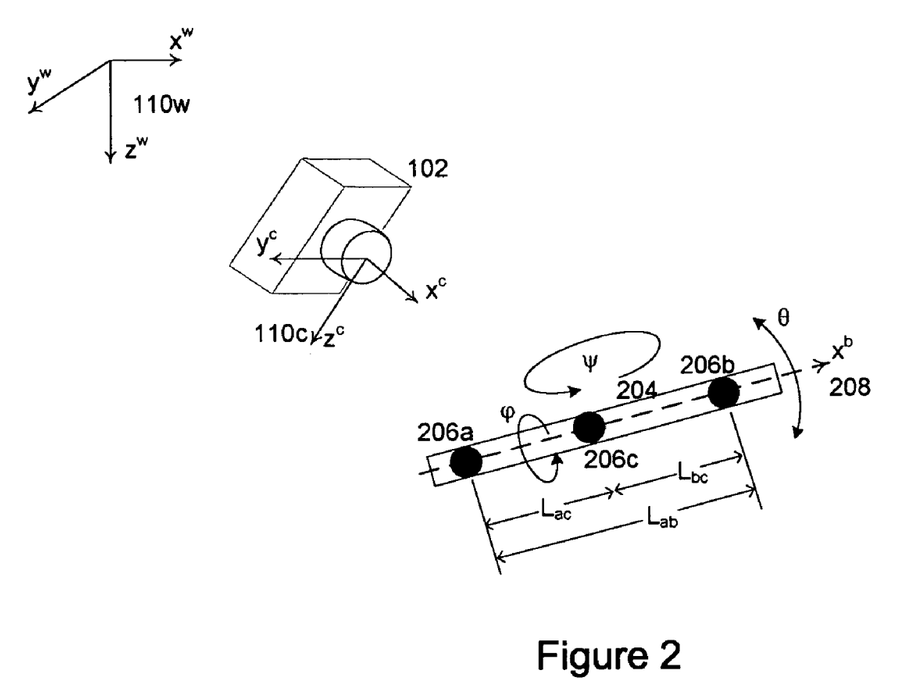
FIG. 2 shows a schematic view of a single camera tracking an object with three target points.

FIG. 1A illustrates the geometry of a single camera 102 with its optical axis aimed along the x-axis in camera space ($x^c$ in coordinate frame 110*c*). Symbols $\psi$, $\theta$, $\phi$ represent the Euler angles yaw, pitch and roll, respectively, of a tracked object 104. Two markers 106*a* and 106*b* are visible on the object 104. We will refer to them as points 1 (106*a*) and 2 (106*b*) in the mathematical computations that follow. Let $r_1^w = [x_1^w \ y_1^w \ z_1^w]$ and $r_2^w = [x_2^w \ y_2^w \ z_2^w]$ represent the coordinates of points 1 and 2 in a world-space with its z axis ($z^w$ in coordinate frame 110*w*) pointing straight down in the direction of gravity, and let L be the distance between the two points. For convenience and without loss of generality, we assume that the b-frame (internal reference frame) coordinates of the object 104 have an origin at point 1 and x-axis $x^b$ pointing towards point 2. Assume that the orientation of the camera with respect to the world-frame is known in advance and can be described by the 3×3 rotation matrix $R_c^w$ which transforms vectors represented in camera coordinates (denoted by superscript c) to vectors in world coordinates (denoted by superscript w). Thus, if the origin of the w-frame 110*w* is made to coincide with the origin of c-frame 110*c* at the camera center of projection, then we have:

$$r_1^c = R_w^c r_1^w$$

$$r_2^c = R_w^c r_2^w \quad (1)$$

Assuming we have an inertial sensor on the object 104 which can accurately determine pitch and roll ($\theta$, $\phi$) by itself, and the camera 102 has reported image plane centroids ($u_1$, $v_1$) and ($u_2$, $v_2$) (see FIG. 1B), we wish to find all 6 coordinates ($x_1^w, y_1^w, z_1^w, \psi, \theta, \phi$) explicitly describing position and orientation of the object in world coordinates.

In world-space, the position of point 2 can be expressed relative to point 1 as follows:

$$r_2^w = r_1^w + \begin{bmatrix} L\cos\theta\cos\psi \\ L\cos\theta\sin\psi \\ -L\sin\theta \end{bmatrix} \quad (2)$$

where both L and $\theta$ are known.

As shown in FIG. 1B, the camera 102 is modeled as a pinhole camera 102*m* having an aperture 120 and a focal length f and points 1 and 2 are projected onto its image plane 122 at ($u_1$, $v_1$) and ($u_2$, $v_2$). (In some examples, wide-angle lenses with lots of distortion are used, in which case the camera is calibrated and undistortion corrections are applied to each 2D image point before carrying out the solution described below. To further simplify the equations, we will use f=1.) Using the pinhole camera model we can express the c-frame positions of points 1 and 2 in terms of the unknown depth values $x_1^c$ and $x_2^c$ and the measured u and v values:

$$r_1^c = [x_1^c \ u_1 x_1^c \ v_1 x_1^c]$$

$$r_2^c = [x_2^c \ u_2 x_2^c \ v_2 x_2^c]^T \quad (3)$$

Rewriting equation (2) in c-frame and inserting equation (3) we have:

$$\begin{bmatrix} x_2^c \\ u_2 x_2^c \\ v_2 x_2^c \end{bmatrix} = \begin{bmatrix} x_1^c \\ u_1 x_1^c \\ v_1 x_1^c \end{bmatrix} + R_w^c \begin{bmatrix} L\cos\theta\cos\psi \\ L\cos\theta\sin\psi \\ -L\sin\theta \end{bmatrix} = \begin{bmatrix} x_1^c \\ u_1 x_1^c \\ v_1 x_1^c \end{bmatrix} + \quad (4)$$

$$R_w^c \begin{bmatrix} L\cos\theta & 0 & 0 \\ 0 & L\cos\theta & 0 \\ 0 & 0 & -L\sin\theta \end{bmatrix} \begin{bmatrix} \cos\psi \\ \sin\psi \\ 1 \end{bmatrix}$$

Since the four measurements ($u_1$, $v_1$) and ($u_2$, $v_2$) and the nine elements of $$A \equiv R_w^c \begin{bmatrix} L\cos\theta & 0 & 0 \\ 0 & L\cos\theta & 0 \\ 0 & 0 & -L\sin\theta \end{bmatrix}$$

are all known, equation (4) represents a system of three equations in three unknowns, $x_2^c$, $x_1^c$, and $\psi$. Eliminating $x_2^c$ by plugging the first line into the second and third yields two equations in $x_1^c$ and $\psi$:

$$x_1^c = \left(\frac{A_{21} - u_2 A_{11}}{u_2 - u_1}\right)\cos\psi + \left(\frac{A_{22} - u_2 A_{12}}{u_2 - u_1}\right)\sin\psi + \left(\frac{A_{23} - u_2 A_{13}}{u_2 - u_1}\right) \quad (5)$$

$$x_1^c = \left(\frac{A_{31} - v_2 A_{11}}{v_2 - v_1}\right)\cos\psi + \left(\frac{A_{32} - v_2 A_{12}}{v_2 - v_1}\right)\sin\psi + \left(\frac{A_{33} - v_2 A_{13}}{v_2 - v_1}\right)$$

Subtracting these produces the relationship:

$$\alpha \cos\psi + \beta \sin\psi + \gamma = 0 \quad (6)$$

where for brevity we have defined:

$$\alpha \equiv \left(\frac{A_{21} - u_2 A_{11}}{u_2 - u_1}\right) - \left(\frac{A_{31} - v_2 A_{11}}{v_2 - v_1}\right)$$

$$\beta \equiv \left(\frac{A_{22} - u_2 A_{12}}{u_2 - u_1}\right) - \left(\frac{A_{32} - v_2 A_{12}}{v_2 - v_1}\right)$$

$$\gamma \equiv \left(\frac{A_{23} - u_2 A_{13}}{u_2 - u_1}\right) - \left(\frac{A_{33} - v_2 A_{13}}{v_2 - v_1}\right)$$

Moving the sine term to the right-hand side and squaring and rearranging terms yields a quadratic equation in $\cos\psi$:

$$(\alpha^2 + \beta^2)\cos^2\psi + 2\alpha\gamma\cos\psi + (\gamma^2 - \beta^2) = 0 \quad (7)$$

Which can be solved to yield two solutions for $\cos\psi$, and thus four solutions for $\psi$. Plugging all four candidates back into equation (5), only two of them will produce agreement, and only one of these will have a positive value of $x_1^c$ as required for a point in front of the camera. This unique correct solution for yaw can be plugged back through the equations to solve for the remaining three unknown pose variables ($x_1^w$, $y_1^w$, and $z_1^w$).

There may be many other mathematical approaches to solving for the unknown variables, but this example serves to illustrate that a priori pitch and roll information from inertial sensors can be combined with four scalar measurements ((u, v) of two points) from computer vision or other bearing sensors to solve for the 6-DOF pose. Note that the roll measurement was not used to compute the other coordinates. In the absence of a measurement of roll, it is still possible to compute a 5-DOF pose using only one camera, two points, and a measurement of pitch.

Once the initial 6-DOF pose is determined, the pose of the object can be tracked using only the information from the inertial sensors with periodic updates from the vision system to correct for drift.

In some examples, the inertial sensors are used not just to obtain accurate prior pitch and roll in order to solve the 2-point pose-recovery algorithm outlined above. After an initial pose estimate is acquired, the inertial sensors are used to perform high-update-rate inertial tracking with optical measurements introduced, when available, to correct drift. This makes it possible to use small or inexpensive cameras with relatively lower frame rate or resolution and still achieve good tracking performance. While the described 2-point pose-recovery algorithm demonstrates that a Kalman filter fusing information from inertial sensors and just two optical targets provides full-observability, it is also true that an inertial system, once properly initialized, can track for a time with just one target visible. With the proper motions, the full 6-DOF pose becomes observable over a time period even using just one target.

Relative Tracking

As noted above, it was assumed that the camera's pose relative to the world-frame was known. The camera's pose can be known simply because its position is tightly controlled. In some examples, the camera may be equipped with its own set of inertial sensors, for example the InertiaCam from InterSense, Inc., of Bedford, Mass. In this case, the camera need not be held stationary. The tracking is performed by differential inertial tracking between the inertial sensors on the tracked object and those on the camera, as described in U.S. Pat. Nos. 6,681,629 and 6,474,159, incorporated here by reference. In this arrangement, the camera may be mounted on a moving platform such as a vehicle, a simulator, a robot, or a person, and can be used to track the marked object relative to the camera. If world-frame mapping of the object's pose is required, the measurements of the camera's inertial sensors relative to gravity can be used to create the required transform. In some examples, inertial sensors do not provide a reliable measurement of the yaw of the camera (rotation around the axis parallel to gravity). A camera yaw of zero can be assumed in the calculations above without affecting the accuracy of the other calculated coordinates. The resulting calculated object position and yaw will be returned in a locally-level world-frame directionally aligned with the camera (having zero yaw displacement between the camera and the world-frame). This is often a convenient tracking reference frame.

One application of this technique is virtual reality (VR) or augmented reality (AR) simulations. A camera with inertial sensors is mounted on a user's head, e.g., on a hat or helmet, and the markers and inertial sensors are located on an object held by the user, such as a tool, a gun, a piece of sports equipment, or a stand-in for such an object. The relative tracking of the object with regard to the user's head can be used to insert an image of the object into a virtual world displayed in a head-mounted display worn by the user. Because the direction the user is looking matches that of the camera, the relative position of the object to the camera can be easily mapped to the appropriate location in the display so that it remains in the correct location when the user either moves the object or looks in another direction. Alternatively, in an augmented reality simulation where the user sees the real world but additional graphics or information are added, the measured relative position of the object can be used to indicate, in the display, what the object is pointed at. This could be used to allow a soldier in the field to rehearse an operation, for example, by adding targets to his real environment and accurately indicating whether his weapon, when fired, would have hit those targets. In an actual combat environment, a projection could be displayed of where the weapon is aimed.

Linear-Array Fiducial Patterns

In the foregoing discussion it was assumed that the bearing sensor is able to uniquely identify and label points 1 and 2 while measuring their centroid locations. This may be accomplished by many different methods. If only one object is to be tracked and it is equipped with only two marker points, then this can be as simple as making one larger or brighter than the other, or making them different colors. However, if multiple objects may be tracked, or one object needs to have multiple pairs of targets on different sides of the object, then a more complex approach is required. With active LED targets, this could be accomplished by turning on the different targets in a specific temporal sequence or encoded blink pattern. For multi-camera motion-capture systems using passive retro-reflective coated balls, the typical approach to making the markers identifiable is to group them together into rigid "marker cliques" with pre-known inter-marker distances. However, to measure these inter-marker distances requires first triangulating the 3D position of each marker with multiple cameras. Tracking multiple objects in our single-camera system requires a method of grouping targets into uniquely identifiable patterns that can be unambiguously recognized by a single camera, with an α priori unknown pose relationship between the object and the camera. To assure it is practical to attach the fiducials to small or thin objects, a linear pattern of dots is used rather than a planar or spatial array.

Simple ratios of distances between points may not work well because these ratios are not preserved under perspective distortion. The 4-point cross-ratio $$\frac{(\overline{ac})(\overline{bd})}{(\overline{ad})(\overline{bc})}$$

(where $\overline{mn}$ is the distance between two points m and n, and a, b, c, and d are four collinear points in order) is known to be invariant under perspective projections and has been used for constructing identifiable fiducial patterns from 4 colinear markers (Robert van Liere & Jurriaan D. Mulder, "Optical Tracking Using Projective Invariant Marker Pattern Properties," IEEE Virtual Reality 2003 Conference, March 22-26, Los Angeles 2003).

Unfortunately, we found this metric to be so sensitive to point measurement noise that only a few different configurations could be reliably distinguished for a reasonable-sized fiducial array. To address these shortcomings, we first estimate the "perspective distortion" or degree of slant of the line away from the camera based on the observed distances between three collinear points having a known relationship. We then use this perspective distortion to compensate the simple ratios of distances instead of a cross-ratio. This results in a much larger number of distinguishable codes for a given length array. In this section we detail one linear fiducial coding scheme, although many other variations or schemes with similar purposes are possible.

Figure 3:
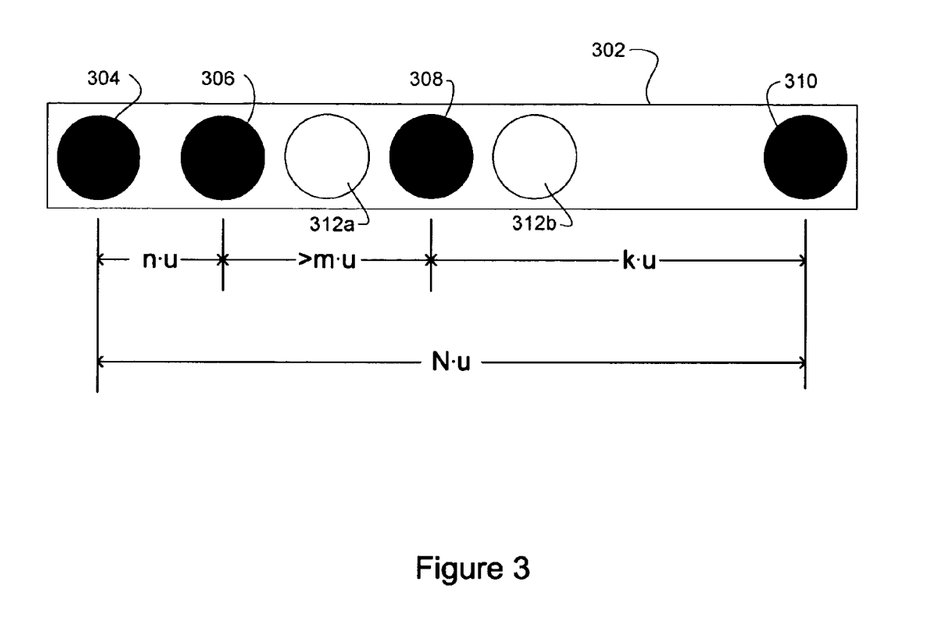
FIG. 3 shows a fiducial strip.

In some examples, as shown in FIG. 3, a linear fiducial 302 (also referred to as a "linear pen," "fiducial pen," "fiducial strip", or "fiducial stick") consists of 4 or more markers 304, 306, 308, 310 arranged in a line, spaced apart by integer multiples of a basic distance unit, u. For pen-sized fiducials viewed at short range within a room-sized environment, u is typically on the order of 5 mm or 1 cm, whereas for larger fiducial strips designed to be viewed from afar it would be correspondingly larger. The length of the linear fiducial 302 is the distance between two outermost markers 304 and 310, expressed as N·u, where N is a positive integer number. The third base marker 306 is located at a distance n·u, n<N, from one end inside this linear fiducial 302. A typical value of n would be small (e.g., 1,2,3,4), while N is significantly larger (e.g., 10 or greater). The end of the fiducial 302 with the third base marker 306 placed close to the endpoint marker 304 is called the "double" end, while the other end is the "single" end because it has no such close neighbor.

A fiducial set is a set of linear fiducials with the same value set (n, N) and distinguished by at least a fourth marker 308. The number of possible distinctive linear fiducials in a fiducial set is the total number of codes that can be distinguished in a particular implementation. When we say "number of codes" we mean the number of distinguishable linear fiducials in a fiducial set.

After the three base markers 304, 306, 310, the rest of markers are called encoding markers and are placed in the "middle" of the linear fiducial with several rules to be observed:
1. Every marker 308 (its centroid) is located a distance k·u, k<N, from the "single" end of the pen, where k is a positive integer. (If there is more than one encoding marker, each will have a different value of k.)
2. Encoding markers cannot be placed closer then 2nu from the single end of the pen, that is, k must be ≧2n, in order to assure that the single end can be distinguished in an image from the double end over a wide range of perspective tilt angles.
3. No two markers may be closer than m·u, where m is chosen between 1 and n to guarantee that every pair of markers is distinguishable in the image over the desired operating range of distances and tilt angles.

Such a fiducial construction provides a large number of unique codes by using at least 4 markers per fiducial (three base markers and at least 1 encoding marker). In FIG. 3, unused potential locations 312a-b for encoding markers are shown by unfilled circles.

Decoding Algorithm

To distinguish the double end from the single end, a processor compares the distance between each observed end and the nearest marker. The end with a closer pair is the double end. As noted above, maintaining a minimum distance of k·u≧2n·u between the single end and the nearest encoding marker assures that the single end can be distinguished unambiguously. Perspective distortion due to rotation of the fiducial towards or away from the camera changes the apparent distance between the markers. A minimum ratio G=k/n=2 assures that the comparison can be accurately made even as the position of the pen places the markers very close together in the camera's image. For example, for a 90 degree field-of-view camera and a 10 cm fiducial, this ratio provides for the comparison to still be made down to a distance of 10 cm (from the camera to the fiducial) with up to a 60 degree tilt angle (fiducial axis with respect to the optical axis of the camera). If a closer distance, sharper tilt, or longer fiducials are needed, then perspective confusion can be avoided by increasing the ratio G However, in most practical tracking applications the ratio G=2 is sufficient to unambiguously distinguish the single end from the double end. The same relationship can be used to assure that three markers can be distinguished in the single-camera tracking solution described above, and to distinguish the end markers in that and the hybrid tracking solution.

Figure 4A:
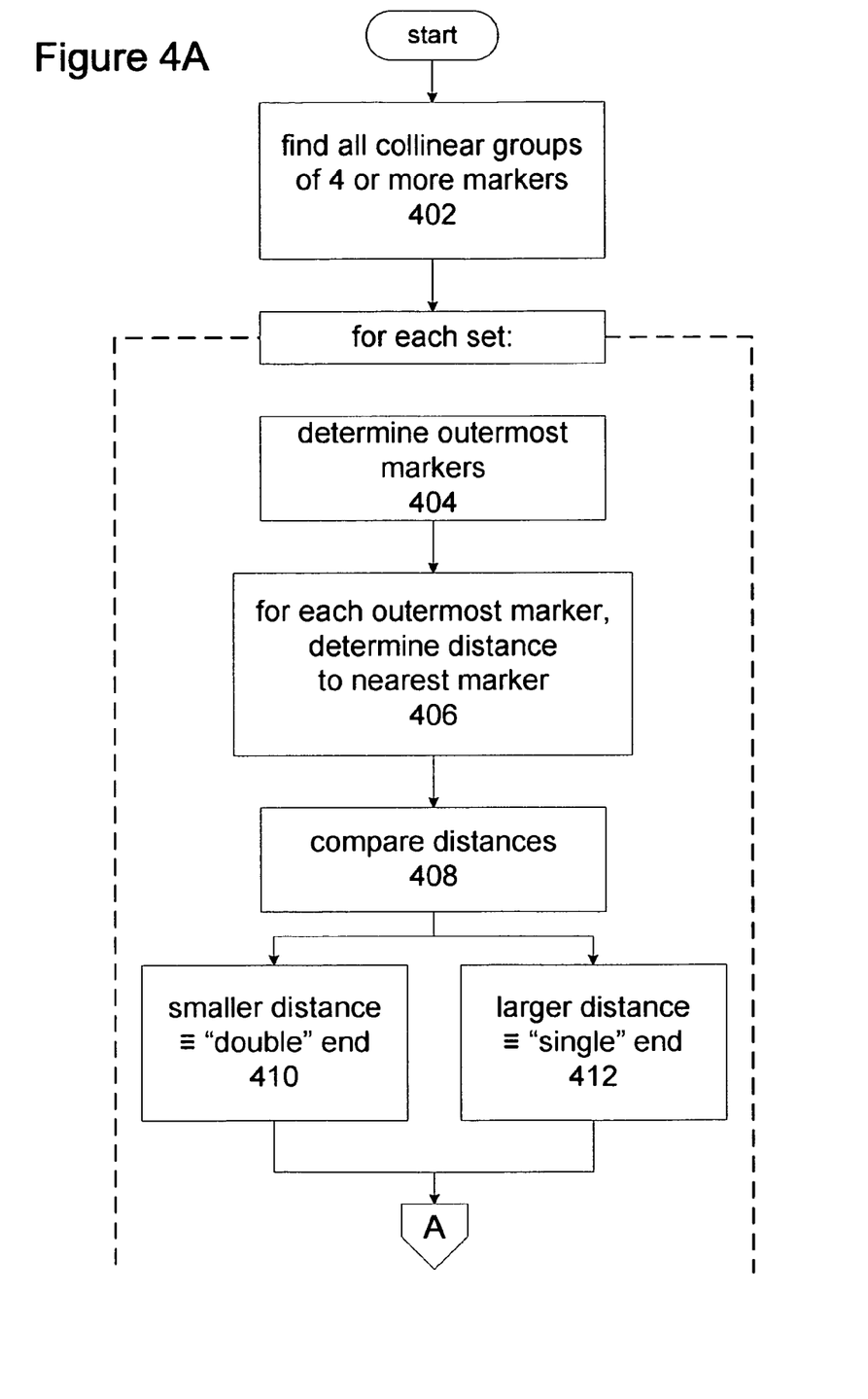
FIGS. 4A and 4B are flow charts.

The algorithm to find and distinguish the ends is summarized in FIG. 4A. First, find (402) all collinear groups of 4 or more markers in the image. (If multiple fiducials will not need to be distinguished, only three markers are needed. Without an encoding marker, the third base marker 306 is the closest marker to each end.) For each set of markers, determine the two outmost markers (404). For each outmost marker, calculate the distance to the nearest marker in the collinear group (406). These 2 distances are compared (408) and the smaller distance represents the double end (410). The larger distance represents the single end (412).

Figure 4B:
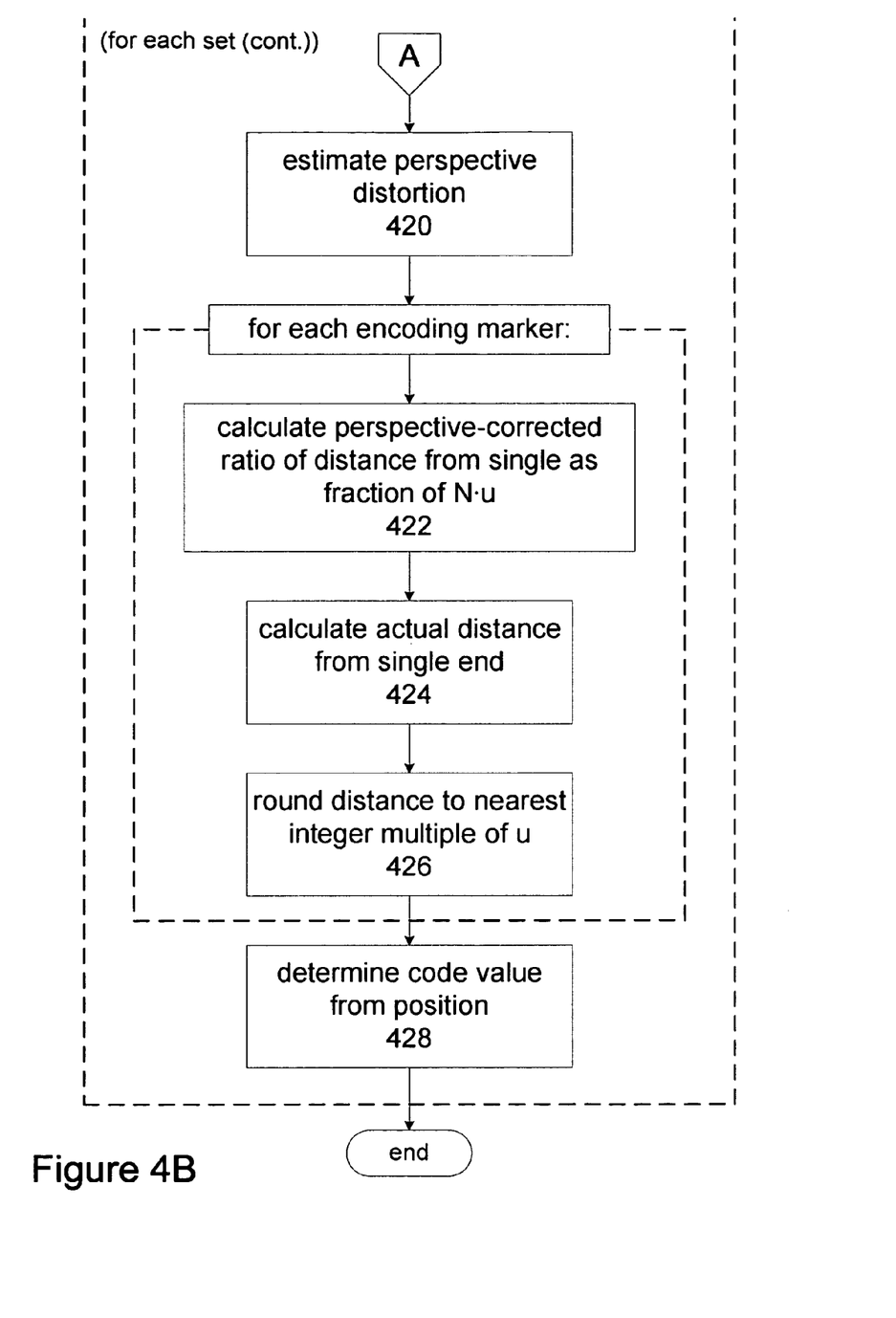

Once the single end and double end are identified, the remaining markers are used to identify each fiducial as shown in FIG. 4B. Perspective distortion of the pen is estimated based on the known geometry of the three base markers (420). This can be done by computing the pose of the pen relative to that of the camera using the two outermost points and the inertial data, as described above for hybrid tracking. Alternatively, a more approximate 5-DOF solution may be found using the six (u, v) measurements of the three base marker centroids and their known geometry, as described in Computer and Robot Vision v.2 by Robert M. Haralick & Linda G Shapiro, Addison-Wesley Publishing Company, pp. 66-68, 1993.

Using this estimate, the perspective-corrected ratios of the distance of each encoding marker from the single end as a fraction of the total length N·u is calculated (422) and can be used to determine the actual distances (424). These distances can then be rounded to the nearest integer multiple of u (426).

Another method of correcting perspective distortion on the encoding marker (step 422), eliminates the need to explicitly estimate the pitch or position of the line segment and allows us to explicitly correct the effect of perspective distortion on the ratio of the distance of the encoding marker from the double end to the total length, using measured image-plane distances and known ratios of the three base markers. To simplify the derivation, we shall assume a camera with its optical axis (camera-frame x-axis) pointed straight down along the world-frame z-axis and with its camera-frame y-axis aligned with the world-frame x-axis. From now on, we work entirely in the world frame, and the pinhole camera image-plane centroid location of point i can be expressed in this frame as $$u_i = x_i/z_i \quad (8)$$

$$v_i = y_i/z_i \quad (9)$$

Assume a fiducial strip located in a plane parallel to the x-z plane, having four collinear markers numbered from left to right 0, 1, c, and 2, corresponding to markers 304, 306, 308, and 310 in FIG. 3. Markers 0, 1, and 2 are the fixed-geometry framing markers, and c is the unknown-position coding marker. The actual physical distances on the strip of markers 1, c and 2 from marker 0 are designated by $L_1$, $L_c$, and $L_2$, respectively. The pitch of the fiducial strip is $\theta$. Expressing the position of marker 1 in terms of marker 0, $$x_1 = x_0 + L_1 \cos\theta \quad (10)$$

$$z_1 = z_0 - L_1 \sin\theta$$

Substituting equation (8) into equation (10), $$u_1 z_1 = u_0 z_0 + L_1 \cos\theta \quad (11)$$

$$z_1 = z_0 - L_1 \sin\theta \quad (12)$$

Substituting equation (12) into equation (11) and re-arranging terms yields $$d_{01}z_0 = L_1(\cos\theta + u_1 \sin\theta) \qquad (13)$$

Where we have defined $d_{ij} = u_j - u_i =$ the image plane distance between points i and j.

Repeating the same steps leading to equation (13) for point 2 yields $$d_{02}z_0 = L_2(\cos\theta + u_2 \sin\theta) \qquad (14)$$

Combining equation (13) and equation (14) to get $$L_1 d_{02}(\cos\theta + u_1 \sin\theta) = L_2 d_{01}(\cos\theta + u_2 \sin\theta)$$

We can divide by $\cos(\theta)$ and rearrange terms to obtain $$\tan\theta = \frac{L_1 d_{02} - L_2 d_{01}}{L_2 d_{01} u_2 - L_1 d_{02} u_1} \qquad (15)$$

Repeating the same derivation with points 0, 1, and c instead of points 0, 1, and 2 produces $$\tan\theta = \frac{L_1 d_{0c} - L_c d_{01}}{L_c d_{01} u_c - L_1 d_{0c} u_1} \qquad (16)$$

By equating equation (15) and equation (16), cross-multiplying and simplifying, we can get to $$\frac{L_c}{L_2} = \frac{d_{0c} d_{12}}{d_{02} d_{1c} + \frac{L_2}{L_1} d_{01} d_{c2}} \qquad (17)$$

Which is the result we seek. This closed-form formula allows us to compute the proportional physical location of the coding marker on the stick, $L_c/L_2$, using just measured image plane distances between different markers, and the known ratio of the fixed marker distances $L_2/L_1$. As can be seen, the final result depends only on inter-marker distances measured in the image sensor, not on any values such as positions that are expressed in any particular coordinate frame. Therefore, this result is general and does not depend on our initial simplifying choice of the camera coordinate system to arrange for the fiducial strip to lie in a plane parallel to the y-z plane.

A code represents the positions of all potential coding markers, and the corresponding value is determined for each calculated set of marker positions (428). For example, the code could be a binary number with a 1 representing each observed marker position and a zero for each potential but vacant position (the marker of FIG. 3 would be encoded '010'). The distances determined indicate which bits are set for each observed set of markers.

Figure 5:
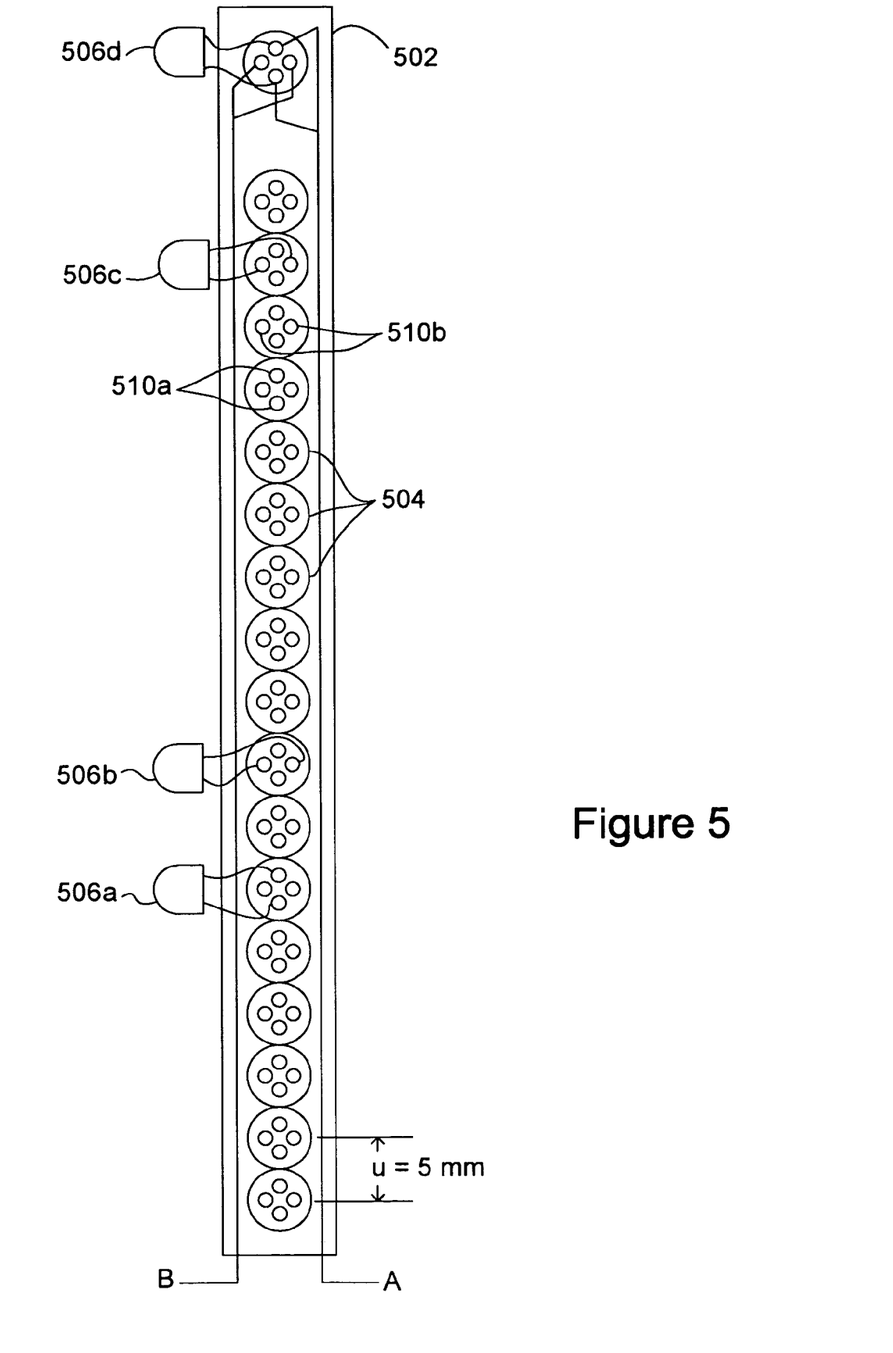
FIG. 5 shows an example implementation of an LED-based fiducial strip.

One example of a configurable fiducial is shown in FIG. 5. A circuit board 502 has a unit spacing u=5 mm between several possible LED installation positions 504 arranged in a row, and a total length of 18u or 9 cm (not drawn to scale). The board may be designed to be snipped shorter, e.g., 6 cm, for smaller volume applications. Each LED 506a-d may be installed in one of two orientations using pairs of terminals 510a or 510b so that it is energized on circuit A or B (connections are shown and terminals labeled only for one location each for clarity). During initial acquisition, both circuits are switched on and all four LEDs 506a-d light up as required for fiducial decoding. During tracking, circuit B is switched off and only the two end LEDs 506a and 506d light. This allows better tracking robustness because there is a lower probability of confusion arising from two active LEDs inside of an image processing search box at the same time.

Another example of a linear fiducial is a passive printed pattern, such as an array of white dots inside a long black rectangle or vice versa. Such a pattern can be printed on adhesive tape or magnetic tape which can be conveniently attached to mark moving objects or fixed objects in the environment. For example, strips of magnetic tape with fiducial patterns could be quickly attached to pipes or girders or metal columns or beams in an industrial environment to establish landmarks to assist in navigation of a robot or autonomously guided vehicle (AGV). In a factory or warehouse, a robot moving in a plane with a camera pointed up towards the ceiling would be able to determine its own location and direction simply by identifying a single strip-fiducial and using its code to look up the position in a database, then using the image plane locations of the two end markers to calculate robot heading and x,y values. In an office environment with typical suspended acoustic panel tiles, the magnetic fiducial tape could be easily attached to some of the metal support rails between ceiling panels in order to establish a fiducial reference system for tracking objects such as cameras or augmented-reality displays that are moving about the building. For objects such as handheld or head-mounted objects which are not constrained to motion in two dimensions, a camera on the object could be combined with an inertial sensor on the object to enable the hybrid calculation of the pose of any fiducial landmark strip according to the methods outlined above in the section entitled "Pose acquisition from one camera using just two points and inertial inclination." This pose can then be inverted to obtain the pose of the moving object relative to the fixed landmark fiducial in the room. After acquiring an initial pose estimate from one such linear fiducial, a hybrid system could then switch into a tracking mode where it uses inertial sensors and optical measurements from any and all fiducial marks and/or natural features that may be found in the field of view as the camera moves about.

The described linear fiducial system has several advantages. As noted, a large number of unique codes may be available. Because perspective distortion can be accounted for, fiducials can be detected and decoded at a variety of angles.

There are many applications which can benefit from linear fiducials. Tracking of long thin objects such as surgical tools, pens, scribes, needles, stylus probes, baseball bats, racquets, golf clubs, fencing foils, rifles, and various hand tools is facilitated. Thin tracking markers are also valuable for attachment to such objects as eyeglasses frames, headphones, earpieces, helmets, limbs, borders of display screens, PDAs, cellphones, and cylindrical objects.

What is claimed is:

1. A method comprising obtaining a camera image from a camera and processing said camera image in a data processor by computing the spatial location and azimuth of an object from the locations, in said camera image, of exactly two points on the object, and information about an orientation of the object, and generating one or more signals representative of the location and azimuth of the object, wherein computing the azimuth of the object comprises:
  receiving coordinate information for images, on an imaging device of a camera, of two points on an object,
  receiving pitch information from a sensor on the object,
  using the coordinate information and the pitch information to obtain candidate values for the azimuth of the object,
  selecting one azimuth value based on an evaluation of the candidate azimuth values in equations relating the coordinate information and pitch information to distances of the points from the camera.

* * * * *